(12) United States Patent
Tang et al.

(10) Patent No.: US 8,154,166 B2
(45) Date of Patent: *Apr. 10, 2012

(54) DUAL LAYER WINDING PATTERN

(75) Inventors: Yifan Tang, Los Altos, CA (US);
Shyi-Perng Phillip Luan, Walnut Creek, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,518

(22) Filed: Apr. 20, 2011

(65) Prior Publication Data

US 2011/0198963 A1   Aug. 18, 2011

Related U.S. Application Data

(62) Division of application No. 12/707,699, filed on Feb. 18, 2010, now Pat. No. 8,069,555.

(51) Int. Cl.
*H02K 3/28* (2006.01)

(52) U.S. Cl. ......... 310/198; 310/184; 310/202; 310/208

(58) Field of Classification Search .......... 310/180, 310/184, 198, 206–208, 202
See application file for complete search history.

(56) References Cited

U.S. PATENT DOCUMENTS

| | | | |
|---|---|---|---|
| 6,170,974 B1 | 1/2001 | Hyypio | |
| 6,359,361 B1 * | 3/2002 | Wakui et al. | 310/179 |
| 6,465,923 B2 * | 10/2002 | Amrhein | 310/90.5 |
| 6,570,290 B2 | 5/2003 | Kazmierczak | |
| 6,768,411 B2 | 7/2004 | Luttrell | |
| 7,252,118 B2 | 8/2007 | Reid | |
| 8,008,827 B1 * | 8/2011 | Tang et al. | 310/184 |
| 8,069,555 B2 * | 12/2011 | Tang et al. | 29/606 |

OTHER PUBLICATIONS

W. Ouyang et al., Analysis of Optimal Stator Concentric Winding Patterns Design, Proceedings of the Eighth International Conference on Electrical Machines and Systems, Sep. 27-29, 2005, vol. 1, pp. 94-98.

\* cited by examiner

*Primary Examiner* — Tran Nguyen

(74) *Attorney, Agent, or Firm* — Patent Law Office of David G. Beck

(57) ABSTRACT

A dual-winding layer arrangement for a three-phase, four pole motor is provided.

20 Claims, 22 Drawing Sheets

Configuration No. 1

1st Layer

Slot 1–30:

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | A1 | A1 | A1 | A1 | B4 | B4 | B4 | B4 | A1 | A1 | A1 | A1 | A1 | A1 | A2 | A2 | A2 | A2 | A2 | C1 | C1 | C1 | C1 | C1 | A2 | A2 | A2 | A2 | A2 |

Slot 31–60:

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | C1 | C1 | C1 | C1 | C1 | C2 | C2 | C2 | C2 | C2 | B3 | B3 | B3 | B3 | B3 | B3 | C2 | C2 | C2 | C2 | C2 | B3 | B3 | B3 | B3 | B3 | B4 | B4 | B4 | B4 |
| Lower | | | | | | | | | | | | | | | | | | | | | | | | | | | | | | |

2nd Layer (in bold & italics)

Slot 1–30:

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | *C3* | *C3* | *C3* | *C3* | *C3* | *C4* | *C4* | *C4* | *C4* | *C4* | *B1* | *B1* | *B1* | *B1* | *B1* | *C4* | *C4* | *C4* | *C4* | *C4* | *B1* | *B1* | *B1* | *B1* | *B1* | *B2* | *B2* | *B2* | *B2* | *B2* |
| Lower | A1 | A1 | A1 | A1 | A1 | B4 | B4 | B4 | B4 | A1 | A1 | A1 | A1 | A1 | A1 | A2 | A2 | A2 | A2 | A2 | C1 | C1 | C1 | C1 | C1 | A2 | A2 | A2 | A2 | A2 |

Slot 31–60:

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | *A3* | *A3* | *B2* | *B2* | *B2* | *B2* | *B2* | *A3* | *A3* | *A3* | *A3* | *A3* | *A4* | *A4* | *A4* | *A4* | *A4* | *C3* | *C3* | *C3* | *C3* | *C3* | *A4* | *A4* | *A4* | *A4* | *A4* |
| Lower | C1 | C1 | C1 | C1 | C1 | C2 | C2 | C2 | C2 | C2 | B3 | B3 | B3 | B3 | B3 | B3 | C2 | C2 | C2 | C2 | C2 | B3 | B3 | B3 | B3 | B3 | B4 | B4 | B4 | B4 |

FIG. 2

Configuration No. 1

Phase A

| Coil | Go | Ret | Span | Turns | Group |
|---|---|---|---|---|---|
| 1 | 1 | 15 | 14 | 1 | A1 |
| 2 | 2 | 14 | 12 | 1 | A1 |
| 3 | 3 | 13 | 10 | 1 | A1 |
| 4 | 4 | 12 | 8 | 1 | A1 |
| 5 | 5 | 11 | 6 | 1 | A1 |
| 6 | 30 | 16 | -14 | 1 | A2 |
| 7 | 29 | 17 | -12 | 1 | A2 |
| 8 | 28 | 18 | -10 | 1 | A2 |
| 9 | 27 | 19 | -8 | 1 | A2 |
| 10 | 26 | 20 | -6 | 1 | A2 |
| 11 | 31 | 45 | 14 | 1 | A3 |
| 12 | 32 | 44 | 12 | 1 | A3 |
| 13 | 33 | 43 | 10 | 1 | A3 |
| 14 | 34 | 42 | 8 | 1 | A3 |
| 15 | 35 | 41 | 6 | 1 | A3 |
| 16 | 60 | 46 | -14 | 1 | A4 |
| 17 | 59 | 47 | -12 | 1 | A4 |
| 18 | 58 | 48 | -10 | 1 | A4 |
| 19 | 57 | 49 | -8 | 1 | A4 |
| 20 | 56 | 50 | -6 | 1 | A4 |

Phase B

| Coil | Go | Ret | Span | Turns | Group |
|---|---|---|---|---|---|
| 1 | 11 | 25 | 14 | 1 | B1 |
| 2 | 12 | 24 | 12 | 1 | B1 |
| 3 | 13 | 23 | 10 | 1 | B1 |
| 4 | 14 | 22 | 8 | 1 | B1 |
| 5 | 15 | 21 | 6 | 1 | B1 |
| 6 | 40 | 26 | -14 | 1 | B2 |
| 7 | 39 | 27 | -12 | 1 | B2 |
| 8 | 38 | 28 | -10 | 1 | B2 |
| 9 | 37 | 29 | -8 | 1 | B2 |
| 10 | 36 | 30 | -6 | 1 | B2 |
| 11 | 41 | 55 | 14 | 1 | B3 |
| 12 | 42 | 54 | 12 | 1 | B3 |
| 13 | 43 | 53 | 10 | 1 | B3 |
| 14 | 44 | 52 | 8 | 1 | B3 |
| 15 | 45 | 51 | 6 | 1 | B3 |
| 16 | 10 | 56 | -14 | 1 | B4 |
| 17 | 9 | 57 | -12 | 1 | B4 |
| 18 | 8 | 58 | -10 | 1 | B4 |
| 19 | 7 | 59 | -8 | 1 | B4 |
| 20 | 6 | 60 | -6 | 1 | B4 |

Phase C

| Coil | Go | Ret | Span | Turns | Group |
|---|---|---|---|---|---|
| 1 | 21 | 35 | 14 | 1 | C1 |
| 2 | 22 | 34 | 12 | 1 | C1 |
| 3 | 23 | 33 | 10 | 1 | C1 |
| 4 | 24 | 32 | 8 | 1 | C1 |
| 5 | 25 | 31 | 6 | 1 | C1 |
| 6 | 50 | 36 | -14 | 1 | C2 |
| 7 | 49 | 37 | -12 | 1 | C2 |
| 8 | 48 | 38 | -10 | 1 | C2 |
| 9 | 47 | 39 | -8 | 1 | C2 |
| 10 | 46 | 40 | -6 | 1 | C2 |
| 11 | 51 | 5 | 14 | 1 | C3 |
| 12 | 52 | 4 | 12 | 1 | C3 |
| 13 | 53 | 3 | 10 | 1 | C3 |
| 14 | 54 | 2 | 8 | 1 | C3 |
| 15 | 55 | 1 | 6 | 1 | C3 |
| 16 | 20 | 6 | -14 | 1 | C4 |
| 17 | 19 | 7 | -12 | 1 | C4 |
| 18 | 18 | 8 | -10 | 1 | C4 |
| 19 | 17 | 9 | -8 | 1 | C4 |
| 20 | 16 | 10 | -6 | 1 | C4 |

FIG. 3

Configuration No. 2

1st Layer

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 |  | A1 | A1 |  |  |  | B4 | B4 | B4 |  |  |  |  | A1 | A2 |  |  |  |  | C1 |  |  |  |  |  |  |  |  | A2 |
| Lower | A1 | A1 | A1 |  |  |  | B4 | B4 | B4 |  |  | A1 | A1 | A1 | A1 | A2 | A2 | A2 | A2 |  | C1 | C1 | C1 | C1 |  |  | A2 | A2 | A2 | A2 |

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper |  |  |  |  | C1 | C2 |  |  |  |  |  | B3 |  |  |  |  |  |  |  | C2 |  |  |  |  | B3 | B4 |  |  |  |  |
| Lower | C1 | C1 | C1 | C1 | C1 | C2 | C2 | C2 | C2 |  | B3 | B3 | B3 | B3 |  | C2 | C2 | C2 | C2 |  |  | B3 | B3 | B3 | B3 | B4 | B4 | B4 | B4 |  |

2nd Layer (in bold & italics)

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | *C3* | *C3* | *C3* | *C3* | *C4* | *C4* | *C4* | *C4* | B4 | *B1* | *B1* | *B1* | *B1* | A1 | A2 | *C4* | *C4* | *C4* | *C4* | C1 | *B1* | *B1* | *B1* | *B1* | *B2* | *B2* | *B2* | *B2* | A2 |
| Lower | A1 | A1 | A1 | A1 | *C3* | *C4* | B4 | B4 | B4 | *B1* | *B1* | A1 | A1 | A1 | A1 | A2 | A2 | A2 | A2 | *C4* | C1 | C1 | C1 | C1 | *B1* | *B2* | A2 | A2 | A2 | A2 |

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | *A3* | C1 | C2 | *B2* | *B2* | *B2* | *B2* | *A3* | *A3* | *A3* | *A3* | *A4* | *A4* | *A4* | *A4* | *A4* | C2 | *C3* | *C3* | *C3* | *C3* | B3 | B4 | *A4* | *A4* | *A4* | *A4* |
| Lower | *A3* | C1 | C1 | C1 | C1 | C2 | C2 | C2 | C2 | *B2* | B3 | B3 | B3 | B3 | *A3* | *A4* | C2 | C2 | C2 | C2 | *C3* | B3 | B3 | B3 | B3 | B4 | B4 | B4 | B4 | *A4* |

FIG. 7

Configuration No. 2

| Phase A | | | | | Phase B | | | | | Phase C | | | | |
|---|---|---|---|---|---|---|---|---|---|---|---|---|---|---|
| Coil | Go | Ret | Span | Turns | Coil | Go | Ret | Span | Turns | Coil | Go | Ret | Span | Turns |
| 1 | 1 | 15 | 14 | 2 | 1 | 11 | 25 | 14 | 2 | 1 | 21 | 35 | 14 | 2 |
| 2 | 2 | 14 | 12 | 1 | 2 | 12 | 24 | 12 | 1 | 2 | 22 | 34 | 12 | 1 |
| 3 | 3 | 13 | 10 | 1 | 3 | 13 | 23 | 10 | 1 | 3 | 23 | 33 | 10 | 1 |
| 4 | 4 | 12 | 8 | 1 | 4 | 14 | 22 | 8 | 1 | 4 | 24 | 32 | 8 | 1 |
| 5 | 30 | 16 | -14 | 2 | 5 | 40 | 26 | -14 | 2 | 5 | 50 | 36 | -14 | 2 |
| 6 | 29 | 17 | -12 | 1 | 6 | 39 | 27 | -12 | 1 | 6 | 49 | 37 | -12 | 1 |
| 7 | 28 | 18 | -10 | 1 | 7 | 38 | 28 | -10 | 1 | 7 | 48 | 38 | -10 | 1 |
| 8 | 27 | 19 | -8 | 1 | 8 | 37 | 29 | -8 | 1 | 8 | 47 | 39 | -8 | 1 |
| 9 | 31 | 45 | 14 | 2 | 9 | 41 | 55 | 14 | 2 | 9 | 51 | 5 | 14 | 2 |
| 10 | 32 | 44 | 12 | 1 | 10 | 42 | 54 | 12 | 1 | 10 | 52 | 4 | 12 | 1 |
| 11 | 33 | 43 | 10 | 1 | 11 | 43 | 53 | 10 | 1 | 11 | 53 | 3 | 10 | 1 |
| 12 | 34 | 42 | 8 | 1 | 12 | 44 | 52 | 8 | 1 | 12 | 54 | 2 | 8 | 1 |
| 13 | 60 | 46 | -14 | 2 | 13 | 10 | 56 | -14 | 2 | 13 | 20 | 6 | -14 | 2 |
| 14 | 59 | 47 | -12 | 1 | 14 | 9 | 57 | -12 | 1 | 14 | 19 | 7 | -12 | 1 |
| 15 | 58 | 48 | -10 | 1 | 15 | 8 | 58 | -10 | 1 | 15 | 18 | 8 | -10 | 1 |
| 16 | 57 | 49 | -8 | 1 | 16 | 7 | 59 | -8 | 1 | 16 | 17 | 9 | -8 | 1 |

Groups: A1 {1-4}, A2 {5-8}, A3 {9-12}, A4 {13-16}; B1 {1-4}, B2 {5-8}, B3 {9-12}, B4 {13-16}; C1 {1-4}, C2 {5-8}, C3 {9-12}, C4 {13-16}

FIG. 8

Configuration No. 3

1st Layer

Upper / Lower

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | | A1 | | | | | | | | B4 | | | | | A1 A2 | A2 | A2 | | | | | C1 | | | | | | | | A2 |
| Lower | A1 | A1 | A1 | A1 | | | | B4 | B4 | B4 | | | | A1 | A1 | A1 | A1 | A2 | A2 | A2 | | | | C1 | C1 | C1 | | | A2 | A2 |

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | | | | | C1 | C2 | C2 | | | | | B3 | | | | | | | C2 | | | | | | B3 | B3 | B4 | | | |
| Lower | A2 | | C1 | C1 | C1 | C1 | C2 | C2 | C2 | | | B3 | B3 | B3 | | | | C2 | C2 | C2 | | | B3 | B3 | B3 | B3 | B4 | B4 | B4 | B4 |

2nd Layer (in bold & italics)

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | *A4* | A1 | *C3* | *C3* | *C3* | *C4* | *C4* | *C4* | *C4* | B4 | *B1* | *B1* | *B1* | *B1* | A1 A2 | A2 | *C4* | *C4* | *C4* | *C4* | C1 | *B1* | *B1* | *B1* | *B1* | *B2* | *B2* | *B2* | *B2* | A2 |
| Lower | A1 | A1 | A1 | *A1* | *C3* | *C3* | *C4* | B4 | B4 | B4 | *B1* | *B1* | A1 | *A3* | *A3* | *A3* | A1 | A2 | A2 | *C4* | C1 | C1 | C1 | *B1* | *B1* | *B1* | *B2* | A2 | A2 | A2 |

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | *A3* | C1 | C2 | C2 | *B2* | *B2* | *B2* | *B2* | B3 | *A3* | *A3* | *A4* | *A4* | *A4* | *A4* | C2 | *C3* | *C3* | *C3* | *C3* | B3 | B3 | B4 | *A4* | *A4* | *A4* | *A4* |
| Lower | A2 | *A3* | C1 | C1 | C1 | C1 | C2 | C2 | C2 | *B2* | *B2* | B3 | B3 | B3 | *A3* | *A3* | *A3* | *A4* | C2 | C2 | *C3* | *C3* | *C3* | B3 | B3 | B3 | B4 | B4 | *A4* | *A4* |

FIG. 10

Configuration No. 3

Phase A

| Coil | Go | Ret | Span | Turns |
|---|---|---|---|---|
| 1 | 1 | 16 | 15 | 1 |
| 2 | 2 | 15 | 13 | 2 |
| 3 | 3 | 14 | 11 | 1 |
| 4 | 4 | 13 | 9 | 1 |
| 5 | 31 | 16 | -15 | 1 |
| 6 | 30 | 17 | -13 | 2 |
| 7 | 29 | 18 | -11 | 1 |
| 8 | 28 | 19 | -9 | 1 |
| 9 | 31 | 46 | 15 | 1 |
| 10 | 32 | 45 | 13 | 2 |
| 11 | 33 | 44 | 11 | 1 |
| 12 | 34 | 43 | 9 | 1 |
| 13 | 1 | 46 | -15 | 1 |
| 14 | 60 | 47 | -13 | 2 |
| 15 | 59 | 48 | -11 | 1 |
| 16 | 58 | 49 | -9 | 1 |

A1: coils 1–4; A2: coils 5–8; A3: coils 9–12; A4: coils 13–16

Phase B

| Coil | Go | Ret | Span | Turns |
|---|---|---|---|---|
| 1 | 11 | 26 | 15 | 1 |
| 2 | 12 | 25 | 13 | 2 |
| 3 | 13 | 24 | 11 | 1 |
| 4 | 14 | 23 | 9 | 1 |
| 5 | 41 | 26 | -15 | 1 |
| 6 | 40 | 27 | -13 | 2 |
| 7 | 39 | 28 | -11 | 1 |
| 8 | 38 | 29 | -9 | 1 |
| 9 | 41 | 56 | 15 | 1 |
| 10 | 42 | 55 | 13 | 2 |
| 11 | 43 | 54 | 11 | 1 |
| 12 | 44 | 53 | 9 | 1 |
| 13 | 11 | 56 | -15 | 1 |
| 14 | 10 | 57 | -13 | 2 |
| 15 | 9 | 58 | -11 | 1 |
| 16 | 8 | 59 | -9 | 1 |

B1: coils 1–4; B2: coils 5–8; B3: coils 9–12; B4: coils 13–16

Phase C

| Coil | Go | Ret | Span | Turns |
|---|---|---|---|---|
| 1 | 21 | 36 | 15 | 1 |
| 2 | 22 | 35 | 13 | 2 |
| 3 | 23 | 34 | 11 | 1 |
| 4 | 24 | 33 | 9 | 1 |
| 5 | 51 | 36 | -15 | 1 |
| 6 | 50 | 37 | -13 | 2 |
| 7 | 49 | 38 | -11 | 1 |
| 8 | 48 | 39 | -9 | 1 |
| 9 | 51 | 6 | 15 | 1 |
| 10 | 52 | 5 | 13 | 2 |
| 11 | 53 | 4 | 11 | 1 |
| 12 | 54 | 3 | 9 | 1 |
| 13 | 21 | 6 | -15 | 1 |
| 14 | 20 | 7 | -13 | 2 |
| 15 | 19 | 8 | -11 | 1 |
| 16 | 18 | 9 | -9 | 1 |

C1: coils 1–4; C2: coils 5–8; C3: coils 9–12; C4: coils 13–16

FIG. 11

Configuration
No. 3

Configuration No. 4

1st Layer

Upper/Lower, Slot 1–30:

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | A1 |  |  |  |  |  | B4 | B4 | B4 |  |  |  | A1 | A1 | A2 | A2 | A2 |  |  | C1 | C1 |  |  |  |  |  |  | A2 | A2 |
| Lower | A1 | A1 |  | C1 | C1 | C2 | C2 |  | B4 | B4 |  |  | A1 | A1 | A1 | A2 | A2 | A2 |  |  | C1 | C1 | C1 |  |  |  |  | A2 | A2 | A2 |

Slot 31–60:

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper |  |  |  | C1 | C1 | C2 | C2 |  |  |  |  | B3 | B3 |  |  |  |  |  | C2 | C2 |  |  |  | B3 | B3 | B4 | B4 |  |  |  |
| Lower |  | C1 | C1 | C1 | C1 | C2 | C2 | C2 |  |  |  | B3 | B3 | B3 |  |  |  | C2 | C2 | C2 |  |  |  | B3 | B3 | B4 | B4 | B4 |  |  |

2nd Layer (in bold & italics)

Slot 1–30:

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | A1 | *C3* | *C3* | *C3* | *C4* | *C4* | *C4* | B4 | B4 | *B1* | *B1* | *B1* | A1 | A1 | A2 | A2 | *C4* | *C4* | *C4* | C1 | C1 | *B1* | *B1* | *B1* | *B2* | *B2* | *B2* | A2 | A2 |
| Lower | A1 | A1 | *A3* | C1 | C1 | C2 | *C4* | *C4* | B4 | B4 | B4 | *B1* | *B1* | A1 | A1 | A1 | A2 | A2 | *C4* | *C4* | C1 | C1 | C1 | *B1* | *B1* | *B2* | *B2* | B4 | A2 | A2 |

Slot 31–60:

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | C1 | C1 | C2 | C2 | *B2* | *B2* | *B2* | *B1* | B3 | B3 | *A3* | *A3* | *A3* | *A4* | *A4* | C2 | C2 | *C3* | *C3* | *C3* | B3 | B3 | B4 | B4 | *A4* | *A4* | *A4* |
| Lower | *A3* | *A3* | C1 | C1 | C1 | C2 | C2 | C2 | *B2* | *B2* | B3 | B3 | B3 | *A3* | *A3* | *A4* | *A4* | *A4* | C2 | C2 | *C3* | *C3* | *C3* | B3 | B3 | B3 | B4 | *A4* | *A4* | *A4* |

FIG. 13

Configuration No. 4

Phase A

| | Coil | Go | Ret | Span | Turns |
|---|---|---|---|---|---|
| A1 | 1 | 1 | 15 | 14 | 2 |
| | 2 | 2 | 14 | 12 | 2 |
| | 3 | 3 | 13 | 10 | 1 |
| A2 | 4 | 30 | 16 | -14 | 2 |
| | 5 | 29 | 17 | -12 | 2 |
| | 6 | 28 | 18 | -10 | 1 |
| A3 | 7 | 31 | 45 | 14 | 2 |
| | 8 | 32 | 44 | 12 | 2 |
| | 9 | 33 | 43 | 10 | 1 |
| A4 | 10 | 60 | 46 | -14 | 2 |
| | 11 | 59 | 47 | -12 | 2 |
| | 12 | 58 | 48 | -10 | 1 |

Phase B

| | Coil | Go | Ret | Span | Turns |
|---|---|---|---|---|---|
| B1 | 1 | 11 | 25 | 14 | 2 |
| | 2 | 12 | 24 | 12 | 2 |
| | 3 | 13 | 23 | 10 | 1 |
| B2 | 4 | 40 | 26 | -14 | 2 |
| | 5 | 39 | 27 | -12 | 2 |
| | 6 | 38 | 28 | -10 | 1 |
| B3 | 7 | 41 | 55 | 14 | 2 |
| | 8 | 42 | 54 | 12 | 2 |
| | 9 | 43 | 53 | 10 | 1 |
| B4 | 10 | 10 | 56 | -14 | 2 |
| | 11 | 9 | 57 | -12 | 2 |
| | 12 | 8 | 58 | -10 | 1 |

Phase C

| | Coil | Go | Ret | Span | Turns |
|---|---|---|---|---|---|
| C1 | 1 | 21 | 35 | 14 | 2 |
| | 2 | 22 | 34 | 12 | 2 |
| | 3 | 23 | 33 | 10 | 1 |
| C2 | 4 | 50 | 36 | -14 | 2 |
| | 5 | 49 | 37 | -12 | 2 |
| | 6 | 48 | 38 | -10 | 1 |
| C3 | 7 | 51 | 5 | 14 | 2 |
| | 8 | 52 | 4 | 12 | 2 |
| | 9 | 53 | 3 | 10 | 1 |
| C4 | 10 | 20 | 6 | -14 | 2 |
| | 11 | 19 | 7 | -12 | 2 |
| | 12 | 18 | 8 | -10 | 1 |

FIG. 14

Configuration No. 5

1st Layer

Slot 1–30:

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | | | | | | | | | | | | | | | A2 | A2 | A2 | | | | | | | | | | | | A2 | A2 |
| Lower | A1 | A1 | A1 | A1 | A1 | | | | B4 | B4 | B4 | B4 | B4 | B4 | A1 | A1 | A1 | A1 | A2 | A2 | A2 | C1 | C1 | C1 | C1 | | | | | |

Slot 31–60:

| | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | | | | | | C2 | C2 | C2 | | | | | | | | | | | C2 | C2 | C2 | C2 | | | | B4 | B4 | B4 | | |
| Lower | A2 | A2 | A2 | C1 | C1 | C1 | C1 | C2 | C2 | B3 | B3 | B3 | B3 | B3 | B3 | | | | | | | | B3 | B3 | B3 | B3 | B3 | B3 | B4 | B4 |

- - - - - - - - - - - - - - - - - - - - - - - - - - - -

2nd Layer (in bold & italics)

Slot 1–30:

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | *A4* | *A4* | *A4* | *C3* | *C3* | *C4* | *C4* | *C4* | *C4* | *C4* | *B1* | *B1* | *B1* | *B1* | *B1* | A2 | A2 | A2 | A2 | *C4* | *C4* | *C4* | *C4* | *B1* | *B1* | *B2* | *B2* | *B2* | *B2* | A2 |
| Lower | A1 | A1 | A1 | A1 | A1 | *C3* | *C3* | *C3* | *C3* | B4 | B4 | B4 | B4 | A1 | A1 | A1 | A1 | A2 | A2 | A2 | A2 | C1 | C1 | C1 | C1 | *B1* | *B1* | *B1* | A2 | A2 |

Slot 31–60:

| | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | *A3* | *A3* | C2 | C2 | C2 | *B2* | *B2* | *B2* | *A3* | *A3* | *A3* | *A4* | *A4* | *A4* | *A4* | *A4* | *A4* | *C3* | *C3* | *C3* | *C3* | *C3* | B4 | B4 | B4 | *A4* | *A4* |
| Lower | A2 | A2 | A2 | C1 | C1 | C1 | C1 | *C3* | *C3* | B3 | B3 | B3 | B3 | B3 | B3 | A3 | A3 | A4 | A4 | A4 | A4 | C3 | C3 | C2 | C2 | B3 | B3 | B3 | B4 | B4 |

FIG. 16

Configuration No. 5

Phase A

| Coil | Go | Ret | Span | Turns | |
|---|---|---|---|---|---|
| 1 | 1 | 18 | 17 | 1 | A1 |
| 2 | 2 | 17 | 15 | 1 | |
| 3 | 3 | 16 | 13 | 1 | |
| 4 | 4 | 15 | 11 | 1 | |
| 5 | 5 | 14 | 9 | 1 | |
| 6 | 33 | 16 | -17 | 1 | A2 |
| 7 | 32 | 17 | -15 | 1 | |
| 8 | 31 | 18 | -13 | 1 | |
| 9 | 30 | 19 | -11 | 1 | |
| 10 | 29 | 20 | -9 | 1 | |
| 11 | 31 | 48 | 17 | 1 | A3 |
| 12 | 32 | 47 | 15 | 1 | |
| 13 | 33 | 46 | 13 | 1 | |
| 14 | 34 | 45 | 11 | 1 | |
| 15 | 35 | 44 | 9 | 1 | |
| 16 | 3 | 46 | -17 | 1 | A4 |
| 17 | 2 | 47 | -15 | 1 | |
| 18 | 1 | 48 | -13 | 1 | |
| 19 | 60 | 49 | -11 | 1 | |
| 20 | 59 | 50 | -9 | 1 | |

Phase B

| Coil | Go | Ret | Span | Turns | |
|---|---|---|---|---|---|
| 1 | 11 | 28 | 17 | 1 | B1 |
| 2 | 12 | 27 | 15 | 1 | |
| 3 | 13 | 26 | 13 | 1 | |
| 4 | 14 | 25 | 11 | 1 | |
| 5 | 15 | 24 | 9 | 1 | |
| 6 | 43 | 26 | -17 | 1 | B2 |
| 7 | 42 | 27 | -15 | 1 | |
| 8 | 41 | 28 | -13 | 1 | |
| 9 | 40 | 29 | -11 | 1 | |
| 10 | 39 | 30 | -9 | 1 | |
| 11 | 41 | 58 | 17 | 1 | B3 |
| 12 | 42 | 57 | 15 | 1 | |
| 13 | 43 | 56 | 13 | 1 | |
| 14 | 44 | 55 | 11 | 1 | |
| 15 | 45 | 54 | 9 | 1 | |
| 16 | 13 | 56 | -17 | 1 | B4 |
| 17 | 12 | 57 | -15 | 1 | |
| 18 | 11 | 58 | -13 | 1 | |
| 19 | 10 | 59 | -11 | 1 | |
| 20 | 9 | 60 | -9 | 1 | |

Phase C

| Coil | Go | Ret | Span | Turns | |
|---|---|---|---|---|---|
| 1 | 21 | 38 | 17 | 1 | C1 |
| 2 | 22 | 37 | 15 | 1 | |
| 3 | 23 | 36 | 13 | 1 | |
| 4 | 24 | 35 | 11 | 1 | |
| 5 | 25 | 34 | 9 | 1 | |
| 6 | 53 | 36 | -17 | 1 | C2 |
| 7 | 52 | 37 | -15 | 1 | |
| 8 | 51 | 38 | -13 | 1 | |
| 9 | 50 | 39 | -11 | 1 | |
| 10 | 49 | 40 | -9 | 1 | |
| 11 | 51 | 8 | 17 | 1 | C3 |
| 12 | 52 | 7 | 15 | 1 | |
| 13 | 53 | 6 | 13 | 1 | |
| 14 | 54 | 5 | 11 | 1 | |
| 15 | 55 | 4 | 9 | 1 | |
| 16 | 23 | 6 | -17 | 1 | C4 |
| 17 | 22 | 7 | -15 | 1 | |
| 18 | 21 | 8 | -13 | 1 | |
| 19 | 20 | 9 | -11 | 1 | |
| 20 | 19 | 10 | -9 | 1 | |

FIG. 17

Configuration No. 6

1st Layer

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | A1 | A1 | A1 | A1 | A1 | A1 | B4 | B4 | B4 | B4 | A1 | A1 | A1 | A1 | A1 | A2 | A2 | A2 | A2 | A2 | A2 | C1 | C1 | C1 | C1 | A2 | A2 | A2 | A2 | A2 |
| Lower | C1 | C1 | C1 | C1 | C1 | C2 | C2 | C2 | C2 | C2 | C2 | C2 | C2 | C2 | C2 | C2 | C2 | C2 | C2 | C2 | C2 | C2 | C2 | C2 | C2 | C2 | C2 | C2 | C2 | C2 |

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | C1 | C1 | C1 | C1 | C1 | C1 | C2 | C2 | C2 | C2 | B3 | B3 | B3 | B3 | B3 | C2 | C2 | C2 | C2 | C2 | C2 | B3 | B3 | B3 | B3 | B3 | B4 | B4 | B4 | B4 |
| Lower | C1 | C1 | C1 | C1 | C1 | C2 | C2 | C2 | C2 | C2 | C2 | C2 | C2 | C2 | C2 | C2 | C2 | C2 | C2 | C2 | B3 | B3 | B3 | B3 | B3 | B3 | B4 | B4 | B4 | B4 |

2nd Layer (in bold & italics)

| Slot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Upper | *C3* | *C3* | *C3* | *C3* | *C3* | *C3* | *C4* | *C4* | *C4* | *C4* | *B1* | *B1* | *B1* | *B1* | *B1* | *C4* | *C4* | *C4* | *C4* | *C4* | *B1* | *B1* | *B1* | *B1* | *B1* | *B2* | *B2* | *B2* | *B2* | *B2* |
| Lower | A1 | A1 | A1 | A1 | A1 | B4 | B4 | B4 | B4 | B4 | A1 | A1 | A1 | A1 | A1 | A2 | A2 | A2 | A2 | A2 | C1 | C1 | C1 | C1 | C1 | A2 | A2 | A2 | A2 | A2 |

| Slot | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| Upper | *A3* | *A3* | *A3* | *A3* | *A3* | *B2* | *B2* | *B2* | *B2* | *B2* | *A3* | *A3* | *A3* | *A3* | *A3* | *A4* | *A4* | *A4* | *A4* | *A4* | *C3* | *C3* | *C3* | *C3* | *C3* | *A4* | *A4* | *A4* | *A4* | *A4* |
| Lower | C1 | C1 | C1 | C1 | C1 | C2 | C2 | C2 | C2 | C2 | B3 | B3 | B3 | B3 | B3 | C2 | C2 | C2 | C2 | C2 | B3 | B3 | B3 | B3 | B3 | B4 | B4 | B4 | B4 | B4 |

FIG. 19

Configuration No. 6

Phase A

| Coil | Go | Ret | Span | Turns | Group |
|---|---|---|---|---|---|
| 1 | 1 | 11 | 10 | 1 | A1 |
| 2 | 2 | 12 | 10 | 1 | A1 |
| 3 | 3 | 13 | 10 | 1 | A1 |
| 4 | 4 | 14 | 10 | 1 | A1 |
| 5 | 5 | 15 | 10 | 1 | A1 |
| 6 | 26 | 16 | -10 | 1 | A2 |
| 7 | 27 | 17 | -10 | 1 | A2 |
| 8 | 28 | 18 | -10 | 1 | A2 |
| 9 | 29 | 19 | -10 | 1 | A2 |
| 10 | 30 | 20 | -10 | 1 | A2 |
| 11 | 31 | 41 | 10 | 1 | A3 |
| 12 | 32 | 42 | 10 | 1 | A3 |
| 13 | 33 | 43 | 10 | 1 | A3 |
| 14 | 34 | 44 | 10 | 1 | A3 |
| 15 | 35 | 45 | 10 | 1 | A3 |
| 16 | 56 | 46 | -10 | 1 | A4 |
| 17 | 57 | 47 | -10 | 1 | A4 |
| 18 | 58 | 48 | -10 | 1 | A4 |
| 19 | 59 | 49 | -10 | 1 | A4 |
| 20 | 60 | 50 | -10 | 1 | A4 |

Phase B

| Coil | Go | Ret | Span | Turns | Group |
|---|---|---|---|---|---|
| 1 | 11 | 21 | 10 | 1 | B1 |
| 2 | 12 | 22 | 10 | 1 | B1 |
| 3 | 13 | 23 | 10 | 1 | B1 |
| 4 | 14 | 24 | 10 | 1 | B1 |
| 5 | 15 | 25 | 10 | 1 | B1 |
| 6 | 36 | 26 | -10 | 1 | B2 |
| 7 | 37 | 27 | -10 | 1 | B2 |
| 8 | 38 | 28 | -10 | 1 | B2 |
| 9 | 39 | 29 | -10 | 1 | B2 |
| 10 | 40 | 30 | -10 | 1 | B2 |
| 11 | 41 | 51 | 10 | 1 | B3 |
| 12 | 42 | 52 | 10 | 1 | B3 |
| 13 | 43 | 53 | 10 | 1 | B3 |
| 14 | 44 | 54 | 10 | 1 | B3 |
| 15 | 45 | 55 | 10 | 1 | B3 |
| 16 | 6 | 56 | -10 | 1 | B4 |
| 17 | 7 | 57 | -10 | 1 | B4 |
| 18 | 8 | 58 | -10 | 1 | B4 |
| 19 | 9 | 59 | -10 | 1 | B4 |
| 20 | 10 | 60 | -10 | 1 | B4 |

Phase C

| Coil | Go | Ret | Span | Turns | Group |
|---|---|---|---|---|---|
| 1 | 21 | 31 | 10 | 1 | C1 |
| 2 | 22 | 32 | 10 | 1 | C1 |
| 3 | 23 | 33 | 10 | 1 | C1 |
| 4 | 24 | 34 | 10 | 1 | C1 |
| 5 | 25 | 35 | 10 | 1 | C1 |
| 6 | 46 | 36 | -10 | 1 | C2 |
| 7 | 47 | 37 | -10 | 1 | C2 |
| 8 | 48 | 38 | -10 | 1 | C2 |
| 9 | 49 | 39 | -10 | 1 | C2 |
| 10 | 50 | 40 | -10 | 1 | C2 |
| 11 | 51 | 1 | 10 | 1 | C3 |
| 12 | 52 | 2 | 10 | 1 | C3 |
| 13 | 53 | 3 | 10 | 1 | C3 |
| 14 | 54 | 4 | 10 | 1 | C3 |
| 15 | 55 | 5 | 10 | 1 | C3 |
| 16 | 16 | 6 | -10 | 1 | C4 |
| 17 | 17 | 7 | -10 | 1 | C4 |
| 18 | 18 | 8 | -10 | 1 | C4 |
| 19 | 19 | 9 | -10 | 1 | C4 |
| 20 | 20 | 10 | -10 | 1 | C4 |

FIG. 20

Configuration No. 7

1st Phase Winding Layer

| Slot  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 |
|-------|----|----|----|----|----|----|----|----|----|----|----|----|----|----|----|----|----|----|----|----|----|----|----|----|----|----|----|----|----|----|
| Upper |    | A1 | A1 | A1 | A1 |    |    |    |    |    |    | A1 | A1 | A1 | A1 | A1 | A2 | A2 | A2 | A2 |    |    |    |    |    | A2 | A2 | A2 | A2 | A2 |
| Lower |    | A3 | A3 | A3 | A3 |    |    |    |    |    |    | A3 | A3 | A3 | A3 | A3 | A4 | A4 | A4 | A4 |    |    |    |    |    | A4 | A4 | A4 | A4 | A4 |

| Slot  | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|-------|----|----|----|----|----|----|----|----|----|----|----|----|----|----|----|----|----|----|----|----|----|----|----|----|----|----|----|----|----|----|
| Upper |    | A1 | A1 | A1 | A1 |    |    |    |    |    |    | A1 | A1 | A1 | A1 | A1 | A2 | A2 | A2 | A2 |    |    |    |    |    | A2 | A2 | A2 | A2 | A2 |
| Lower |    | A3 | A3 | A3 | A3 |    |    |    |    |    |    | A3 | A3 | A3 | A3 | A3 | A4 | A4 | A4 | A4 |    |    |    |    |    | A4 | A4 | A4 | A4 | A4 |

2nd Phase Winding Layer

| Slot  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 |
|-------|----|----|----|----|----|----|----|----|----|----|----|----|----|----|----|----|----|----|----|----|----|----|----|----|----|----|----|----|----|----|
| Upper | A1 | A1 | A1 | A1 | A1 | B4 | B4 | B4 | B4 | B4 | B1 | B1 | B1 | B1 | B1 | A1 | A1 | A2 | A2 | A2 | B1 | B1 | B1 | B1 | B1 | B2 | B2 | B2 | B2 | B2 |
| Lower | A3 | A3 | A3 | A3 | A3 | B2 | B2 | B2 | B2 | B2 | B3 | B3 | B3 | B3 | B3 | A3 | A3 | A4 | A4 | A4 | B3 | B3 | B3 | B3 | B3 | A4 | A4 | A4 | A4 | A4 |

| Slot  | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|-------|----|----|----|----|----|----|----|----|----|----|----|----|----|----|----|----|----|----|----|----|----|----|----|----|----|----|----|----|----|----|
| Upper | A1 | A1 | A1 | A1 | A1 | B4 | B4 | B4 | B4 | B4 | B1 | B1 | B1 | B1 | B1 | A1 | A1 | A2 | A2 | A2 | B1 | B1 | B1 | B1 | B1 | B2 | B2 | B2 | B2 | B2 |
| Lower | A3 | A3 | A3 | A3 | A3 | B2 | B2 | B2 | B2 | B2 | B3 | B3 | B3 | B3 | B3 | A3 | A3 | A4 | A4 | A4 | B3 | B3 | B3 | B3 | B3 | A4 | A4 | A4 | A4 | A4 |

3rd Phase Winding Layer

| Slot  | 1  | 2  | 3  | 4  | 5  | 6  | 7  | 8  | 9  | 10 | 11 | 12 | 13 | 14 | 15 | 16 | 17 | 18 | 19 | 20 | 21 | 22 | 23 | 24 | 25 | 26 | 27 | 28 | 29 | 30 |
|-------|----|----|----|----|----|----|----|----|----|----|----|----|----|----|----|----|----|----|----|----|----|----|----|----|----|----|----|----|----|----|
| Upper | C3 | C3 | C3 | C3 | C3 | C4 | C4 | C4 | C4 | C4 | B1 | B1 | B1 | B1 | B1 | A1 | A1 | A2 | A2 | A2 | C1 | C1 | C1 | C1 | C1 | B2 | B2 | B2 | B2 | B2 |
| Lower | A1 | A1 | A1 | A1 | A1 | B4 | B4 | B4 | B4 | B4 | B3 | B3 | B3 | B3 | B3 | A3 | A3 | A4 | A4 | A4 | B1 | B1 | B1 | B1 | B1 | A4 | A4 | A4 | A4 | A4 |

| Slot  | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|-------|----|----|----|----|----|----|----|----|----|----|----|----|----|----|----|----|----|----|----|----|----|----|----|----|----|----|----|----|----|----|
| Upper | C1 | C1 | C1 | C1 | C1 | C2 | C2 | C2 | C2 | C2 | B3 | B3 | B3 | B3 | B3 | C2 | C2 | C2 | C2 | C2 | C3 | C3 | C3 | C3 | C3 | B4 | B4 | B4 | B4 | B4 |
| Lower | A3 | A3 | A3 | A3 | A3 | B2 | B2 | B2 | B2 | B2 | A3 | A3 | A3 | A3 | A3 | A4 | A4 | A4 | A4 | A4 | B3 | B3 | B3 | B3 | B3 | A4 | A4 | A4 | A4 | A4 |

FIG. 22

DUAL LAYER WINDING PATTERN

CROSS-REFERENCES TO RELATED APPLICATIONS

This application is a divisional of U.S. patent application Ser. No. 12/707,699, filed Feb. 18, 2010, the disclosure of which is incorporated herein by reference for any and all purposes.

FIELD OF THE INVENTION

The present invention relates generally to electric motors and, more particularly, to a winding pattern that achieves the benefits of lap winding and concentric winding.

BACKGROUND OF THE INVENTION

The trend towards designing and building fuel efficient, low emission vehicles has increased dramatically over the last decade, with significant emphasis being placed on the development of hybrid and all-electric vehicles. This has led, in turn, to a greater emphasis being placed on electric motors, either as the sole source of propulsion (e.g., all-electric vehicles) or as a secondary source of propulsion in a combined propulsion system (e.g., hybrid or dual electric motor vehicles).

AC induction motors are well known and are used in a variety of applications ranging from industrial to automotive. In such a motor, a magnetic field is generated by a plurality of circumferentially distributed coil windings secured within a plurality of circumferentially distributed slots in the inner periphery of the motor's stator, the coil windings being coupled to an AC power source. The magnetic field generated within the stator core causes rotation of the motor's rotor, the rotor being comprised of one or more magnetic pole pairs.

In general, the coil windings of the stator are divided into phases with the number of phases typically equaling the number of phases of the power supply. Each phase of the coil windings is then arranged into coil groups, with each coil group representing a single pole of a single phase. Each coil group is comprised of one or more individual coils or coil windings. Thus a typical winding pattern for a single phase, two-pole induction motor will include two coil groups while a three-phase, two-pole induction motor will include six coil groups. The manner in which the individual coil windings of the coil groups are arranged within the slots of the stator will determine, in part, the performance characteristics of the motor as well as its manufacturing cost. Typically, one of two winding methodologies is used, referred to as concentric winding and lap winding.

Concentric winding is probably the most common winding methodology, at least for those applications in which cost is a factor, since this methodology is easily automated and therefore relatively cost effective. In a concentric arrangement, the individual coil windings comprising each coil group are concentrically arranged about the pole center with all of the windings within a group being positioned at the same radial depth in their respective stator slots. While this approach can be automated, such an arrangement typically results in unwanted spatial harmonics in the stator winding magnetomotive force (MMF) waveform, thereby affecting motor performance.

In lap winding, the other common winding method, a coil overlapping arrangement is applied in which the configuration of each coil is substantially the same and in which one side of each coil overlaps a side of another coil. As a result of using substantially similar coils with similar winding resistances, the electrical characteristics for each phase are well balanced, thereby reducing the harmonic content in the stator winding MMF waveform. Unfortunately, while this approach yields superior motor characteristics, it does not lend itself to automation, resulting in a more costly manufacturing process.

Accordingly, what is needed is an electric motor winding arrangement that achieves the benefits of lap winding, while lending itself to automation. The present invention provides such a winding pattern and a corresponding automated manufacturing process.

SUMMARY OF THE INVENTION

The present invention provides a dual-layer winding arrangement for a three-phase, four pole motor and a method of manufacturing the same. The first winding layer is comprised of six coil groups, and more specifically of a first and a second first phase coil group, a first and a second second phase coil group and a first and a second third phase coil group. The second winding layer is comprised of a second set of six coil groups, and more specifically of a third and a fourth first phase coil group, a third and a fourth second phase coil group and a third and a fourth third phase coil group. The first and second first phase coil groups comprise a first pole pair of the first phase, the third and fourth first phase coil groups comprise a second pole pair of the first phase, the first and second second phase coil groups comprise a first pole pair of the second phase, the third and fourth second phase coil groups comprise a second pole pair of the second phase, the first and second third phase coil groups comprise a first pole pair of the third phase, and the third and fourth third phase coil groups comprise a second pole pair of the third phase. Preferably the first inter-pole connection electrically connecting the first and second first phase coil groups is formed automatically by using a continuous wire/wire bundle to form the first and second first phase coil groups; preferably the second inter-pole connection electrically connecting the first and second second phase coil groups is formed automatically by using a continuous wire/wire bundle to form the first and second second phase coil groups; preferably the third inter-pole connection electrically connecting the first and second third phase coil groups is formed automatically by using a continuous wire/wire bundle to form the first and second third phase coil groups; preferably the fourth inter-pole connection electrically connecting the third and fourth first phase coil groups is formed automatically by using a continuous wire/wire bundle to form the third and fourth first phase coil groups; preferably the fifth inter-pole connection electrically connecting the third and fourth second phase coil groups is formed automatically by using a continuous wire/wire bundle to form the third and fourth second phase coil groups; and preferably the sixth inter-pole connection electrically connecting the third and fourth third phase coil groups is formed automatically by using a continuous wire/wire bundle to form the third and fourth third phase coil groups. The stator of the three-phase, four pole motor may have 60 slots. Each coil group may be comprised of three, four, five, or a different number of coils.

In at least one configuration, each coil group is arranged in a concentric pattern with no overlap between the concentric coil groups comprising the first winding layer and no overlap between the concentric coil groups comprising the second winding layer, and with the first winding layer filling the lower portion of every stator slot and the second winding layer filling the upper portion of every stator slot. The coil groups in this configuration may be comprised of any number of coils, for example five coils, with each coil in each coil group being a single turn coil.

In at least one alternate configuration, each coil group is comprised of a plurality of coils, with one of the plurality being a double turn coil, and with the double turn coil for each coil group being positioned either in the outermost coil position or in a slot adjacent to the outermost coil position.

In at least one alternate configuration, each coil group is comprised of a plurality of coils, with two of the plurality being double turn coils, and with one of the double turn coils of each coil group being positioned in the outermost coil position and with the other of the double turn coils of each coil group being positioned in a slot adjacent to the outermost coil position.

In at least one alternate configuration, the second first phase coil group overlaps the first first phase coil group; the second second phase coil group overlaps the first second phase coil group; the second third phase coil group overlaps the first third phase coil group; the fourth first phase coil group overlaps the third first phase coil group; the fourth second phase coil group overlaps the third second phase coil group; and the fourth third phase coil group overlaps the third third phase coil group.

In at least one alternate configuration, three coils of the second first phase coil group overlap three coils of the first first phase coil group; three coils of the second second phase coil group overlap three coils of the first second phase coil group; three coils of the second third phase coil group overlap three coils of the first third phase coil group; three coils of the fourth first phase coil group overlap three coils of the third first phase coil group; three coils of the fourth second phase coil group overlap three coils of the third second phase coil group; and three coils of the fourth third phase coil group overlap three coils of the third third phase coil group.

In at least one configuration, each coil group is arranged in a lap winding pattern with no overlap between the individual coil groups comprising the first winding layer and no overlap between the individual coil groups comprising the second winding layer, and with the first winding layer filling the lower portion of every stator slot and the second winding layer filling the upper portion of every stator slot. The coil groups in this configuration may be comprised of any number of coils, for example five coils, with each coil in each coil group being a single turn coil.

A further understanding of the nature and advantages of the present invention may be realized by reference to the remaining portions of the specification and the drawings.

BRIEF DESCRIPTION OF THE DRAWINGS

FIG. 2 provides the coil make-up for each winding layer of a first preferred embodiment;

FIG. 3 provides the coil make-up for each phase of the first preferred embodiment;

FIG. 7 provides the coil make-up for each winding layer of a second preferred embodiment;

FIG. 8 provides the coil make-up for each phase of the second preferred embodiment;

FIG. 10 provides the coil make-up for each winding layer of a third preferred embodiment;

FIG. 11 provides the coil make-up for each phase of the third preferred embodiment;

FIG. 13 provides the coil make-up for each winding layer of a fourth preferred embodiment;

FIG. 14 provides the coil make-up for each phase of the fourth preferred embodiment;

FIG. 16 provides the coil make-up for each winding layer of a fifth preferred embodiment;

FIG. 17 provides the coil make-up for each phase of the fifth preferred embodiment;

FIG. 19 provides the coil make-up for each winding layer of a sixth preferred embodiment;

FIG. 20 provides the coil make-up for each phase of the sixth preferred embodiment;

FIG. 22 provides the coil make-up for each winding layer of a seventh preferred embodiment.

DESCRIPTION OF THE SPECIFIC EMBODIMENTS

The present invention utilizes a three-phase, four pole design with a two layer winding insertion technique to achieve the motor performance characteristics commonly associated with lap winding along with the ease of manufacturing associated with concentric winding. In general, the present technique requires that the first winding layer be comprised of the coil groups for six individual poles, two per phase, and that the second winding layer be comprised of the coil groups for six individual poles, two per phase. Within each layer, the two poles per phase are members of a pole pair, thereby forming the complementary poles (e.g., north and south poles) of an electromagnet. Thus, for example, the first layer would include poles A1 and A2 of phase A while the second layer would include poles A3 and A4 of phase A, where poles A1 and A2 comprise a first pole pair and poles A3 and A4 comprise a second pole pair, both pole pairs associated with the same phase. Utilizing this approach, and as described and illustrated below, each winding layer can be fabricated utilizing an only slightly modified concentric winding technique, thus lending itself to automation.

While the present invention may be used with patterns utilizing more than two layers, the inventors have found that a two-layer design is optimal as it allows excellent motor performance characteristics to be achieved while being simple enough to be automated. Accordingly, while the following examples only describe two-layer configurations, it will be appreciated that the invention may also be applied to configurations with more than two layers.

Figure 1:
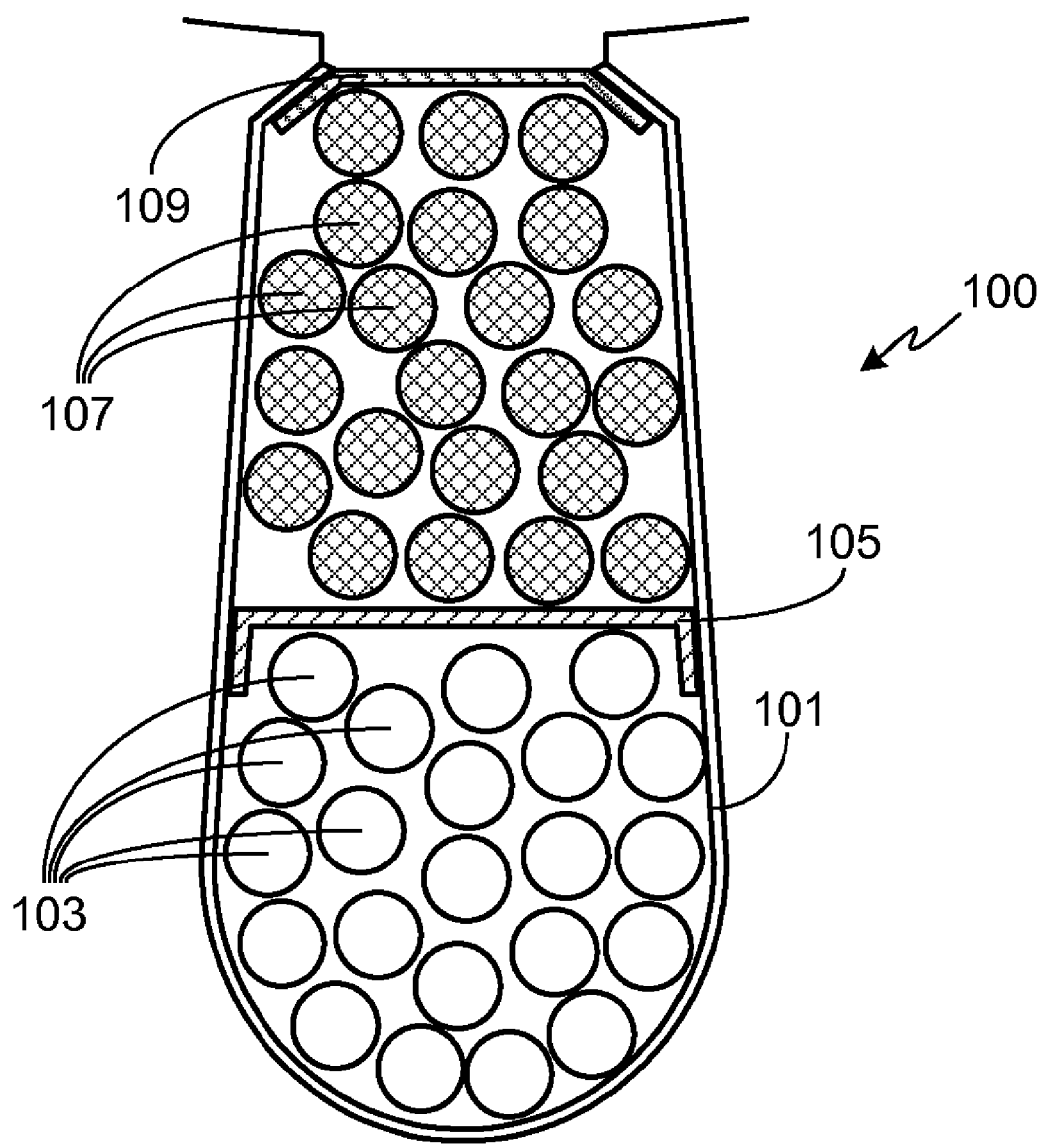
FIG. 1 is a cross-sectional view of a stator slot with two winding layers in place.

FIG. 1 is a cross-sectional view of a single slot 100 of a stator assembly, not shown. Prior to winding insertion, slot insulation liner 101 is inserted within the slot. Next, and assuming that slot 100 is to be filled with only two turns, the first turn of the first coil is inserted into the slot. In this example, this turn is comprised of a bundle of insulated wires 103. It will be appreciated by those of skill in the art that the number and gauge of wires 103 depend upon the desired motor characteristics. During fabrication, the next step requires that wires 103 be pushed, or otherwise compacted, into slot 100. After compaction, a phase insulation separator 105 is inserted within slot 100. If the first coil, comprised of wires 103, and the second coil, comprised of wires 107, are of the same phase, phase insulation separator 105 may not be required. Next, the second turn is inserted into slot 100, this turn being comprised of insulated wires 107. As described and illustrated below, the second turn may be from the same coil group or a different coil group. As previously noted with respect to wires 103, each wire 107 may be comprised of multiple wire strands, or a single wire strand. After a second compaction step, a slot top wedge 109 is inserted into slot 100 in order to ensure that the wires remain within the slot.

FIGS. 2-5 illustrate a first preferred embodiment of the invention. This configuration, as with the other illustrated embodiments, utilizes a 60-slot stator. It should be understood, however, that the invention is not limited to a 60-slot stator, rather, the inventors found that this configuration yielded the desired motor performance without becoming too complex for automation. Other exemplary configurations utilize 48-slot stators (i.e., coil groups with 4 coils per group) and 72-slot stators (i.e., coil groups with 6 coils per group).

FIG. 2 illustrates the coil make-up for each winding layer. As shown, in this embodiment each winding layer utilizes a relatively simple concentric winding pattern, with each coil group preferably comprised of five coils. Note that as used throughout this specification, the first winding layer, also simply referred to as the first layer, indicates the first set of coils inserted into the stator slots, where the first set of coils is comprised of the coil groups for six poles, two from each phase. Similarly, the second winding layer, also simply referred to as the second layer, indicates the second set of coils inserted into the stator slots, where the second set of coils is comprised of the coil groups for the remaining six poles, two from each phase. It should be understood, and as will be illustrated in subsequent embodiments of the invention, in some configurations a single winding layer (either the first or the second winding layer) may have two turns from the same coil group inserted within a single stator slot. In such a configuration, both turns are members of the same concentric coil group and are part of the same, single winding layer.

Figure 4:
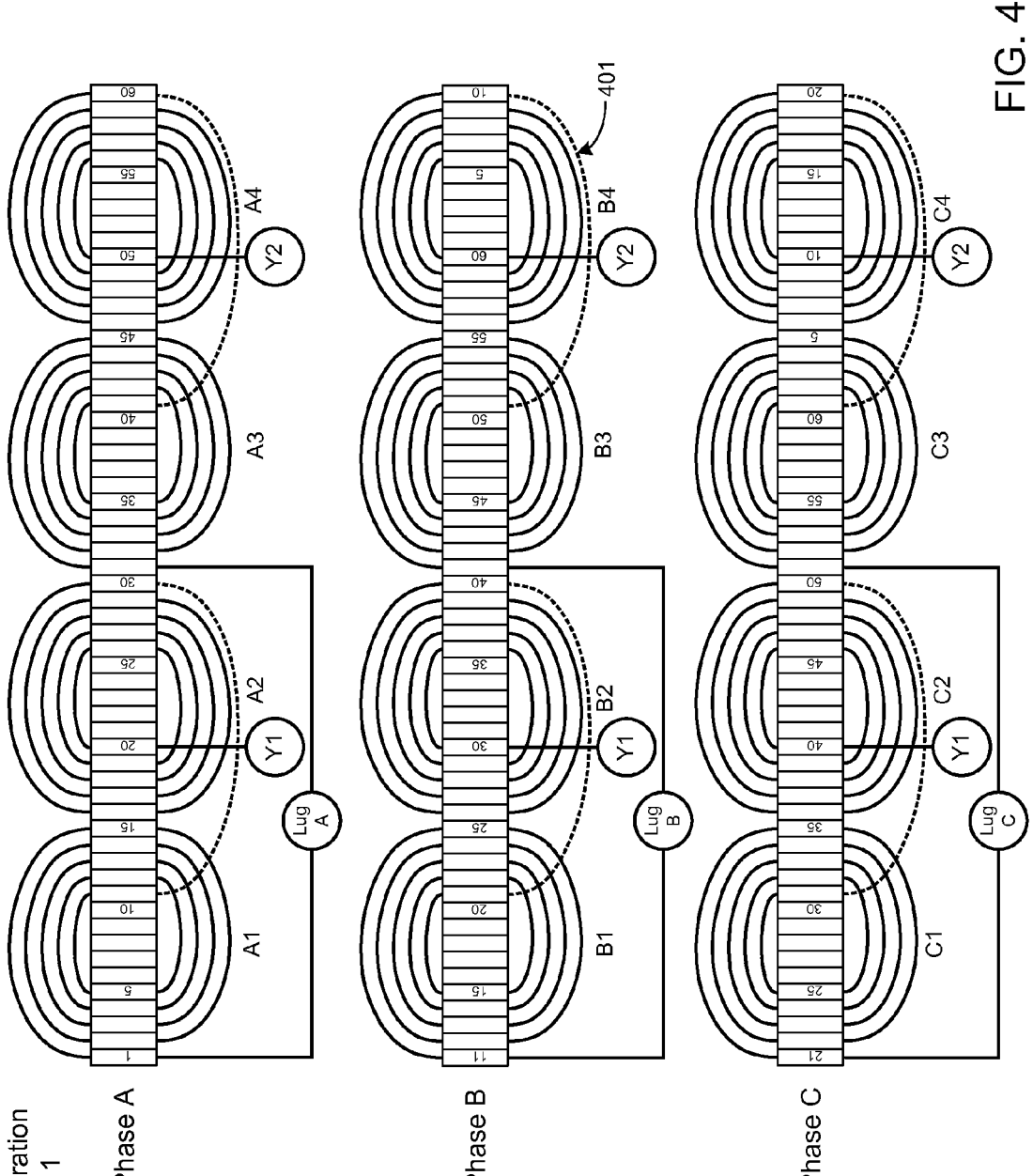
FIG. 4 diagrammatically illustrates the coil make-up for each phase of the first preferred embodiment.
Figure 5:
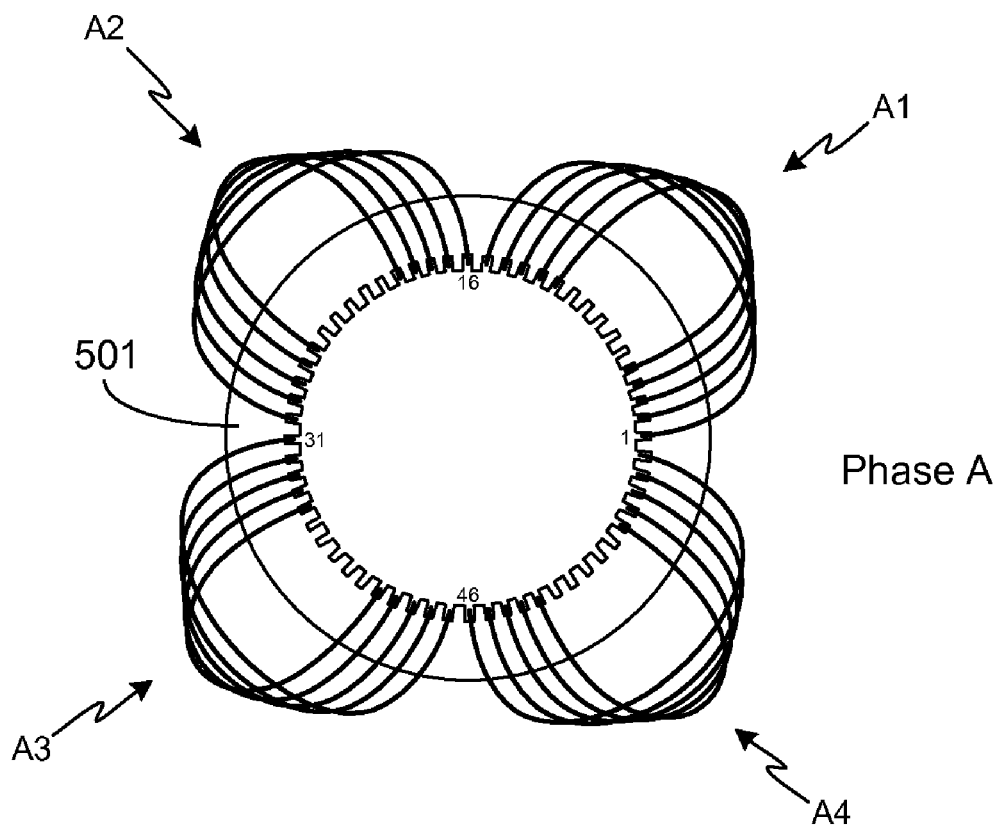
FIG. 5 diagrammatically illustrates the coil configuration of a first phase of the first preferred embodiment.

In FIG. 2, each winding layer is comprised of six concentric coil groups in which there is no coil overlap. As previously described, the six coil groups for each winding layer are comprised of two coil groups per phase, where the two same-phase coil groups per phase are from the same pole pair. In other words, the same-phase coil groups in a single layer are adjacent to one another and are complementary poles, i.e., comprise the same pole pair. This aspect of the invention is illustrated in FIG. 4, which shows the four coil groups per phase. This aspect is also illustrated in FIG. 5 in which the four coil groups for Phase A are illustrated in a 60-slot stator 501. As shown, coil groups A1 and A2 are members of one pole pair, i.e., they oppose each other in an electromagnetic sense, while coil groups A3 and A4 comprise a second pole pair. Note that coil groups A1 and A2 are part of the first winding layer while coil groups A3 and A4 are part of the second winding layer.

As previously noted, in FIG. 2 both winding layers are shown. The first winding layer completely fills the lower portion of each of the stator slots, with no overlap and no skipped slots. Similarly, the second winding layer completely fills the slots, albeit the upper portion of each stator slot. Note that in FIG. 2, the phase designators for each second layer coil are italicized and in bold.

FIG. 3 provides the coil winding information for each coil of the first preferred embodiment, i.e., configuration number 1, and as such corresponds to the data provided in FIG. 2. FIG. 3, however, provides the specific stator slots for each coil, and thus the span distance for each coil. For example, coil 1 of phase A goes from slot 1 to slot 15, spanning a distance of 14 slots. Similarly, coil 6 of phase A goes from slot 30 to slot 16, therefore also spanning a distance of 14 slots. The direction of winding for these two coils, however, are opposite from one another, thus establishing opposing magnetic poles. Note that the winding direction is indicated by the negative sign in front of the span distance (e.g., as shown in the span columns for coil groups A2 and A4).

Figure 6:
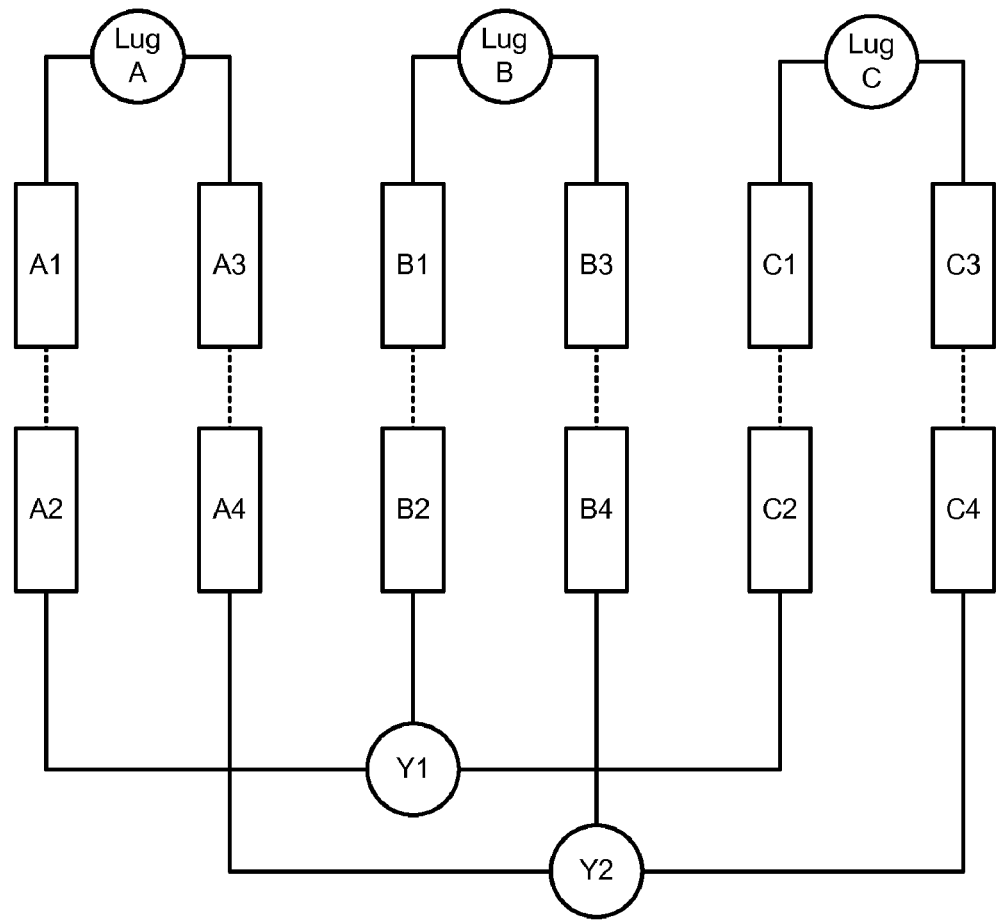
FIG. 6 illustrates the inter-pole connections of the three-phase, four pole motor of the present invention.

FIG. 4 diagrammatically provides the same information as given in FIG. 3. The dotted lines in FIG. 4, e.g., line 401, represent inter-pole connections. Note that due to the winding approach provided by the invention, these inter-pole connections are accomplished during the winding and coil insertion process, not after coil insertion as is common in prior art winding patterns. Thus, for example, the same continuous wire or wire bundle is used to first form the coils in the A1 coil group, and then the coils in the A2 coil group, thereby automatically forming the inter-pole connection during fabrication of the winding layer and eliminating the need for post-insertion fabrication of the inter-pole connection between these two coil groups. The elimination of the post-insertion inter-pole connection steps simplifies motor production, thus reducing cost and motor complexity while improving motor reliability and quality. These same inter-pole connections are also illustrated in FIG. 6, this figure providing the coil group connections for the four pole, three phase configurations of the present invention.

Figure 9:
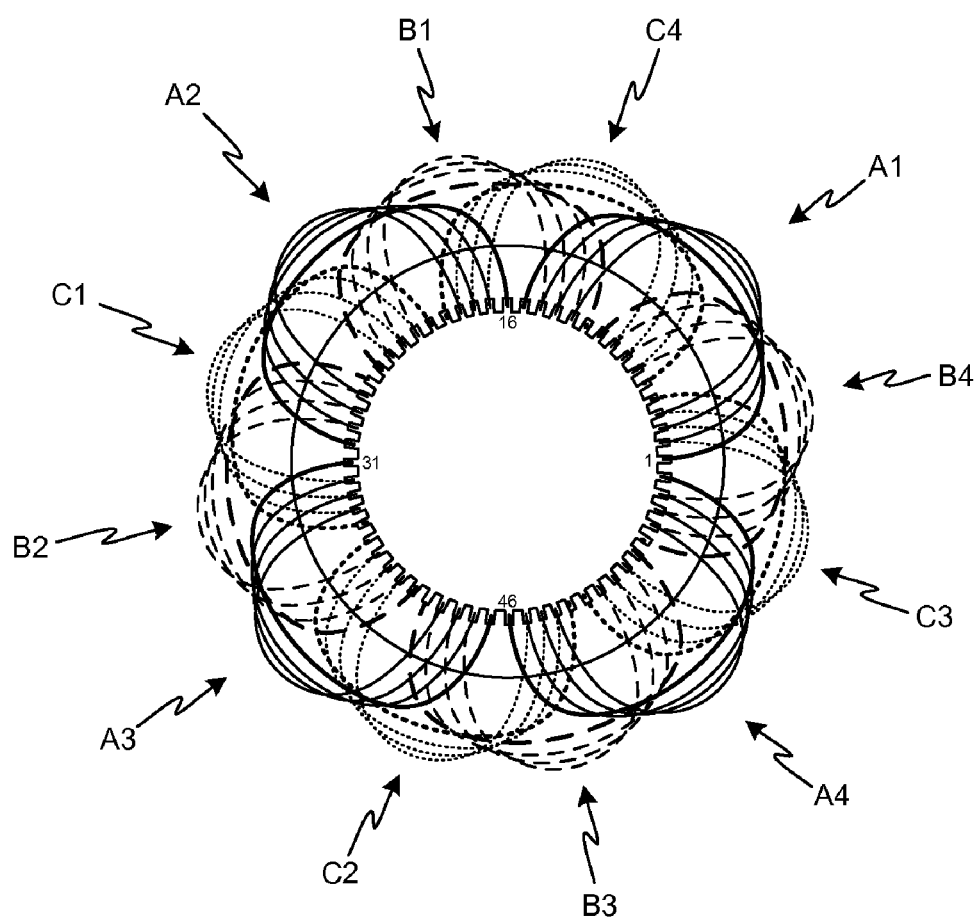
FIG. 9 diagrammatically illustrates the coil configuration for each phase of the second preferred embodiment.

FIGS. 7-9 illustrate a second preferred embodiment of the invention. FIG. 7 provides the coil information, per layer, and FIG. 8 provides the corresponding detailed coil information. In this embodiment, while each coil group is comprised of five coils, two of the coils of each coil group are inserted into a single stator slot. Therefore in those slots in which two turns of the same coil group are inserted, the slot is filled during the insertion of a single winding layer (assuming a two-turn configuration as is preferred). This aspect of this embodiment is shown in both FIGS. 7 and 8. See, for example, slot 1 in which two turns of coil group A1 are inserted during the first winding layer fabrication step; similarly, slot 5 in which two turns of coil C3 are inserted during the second winding layer fabrication step. Note that in FIG. 9, which diagrammatically illustrates configuration 2, the double turn coils are shown in bold.

Figure 12:
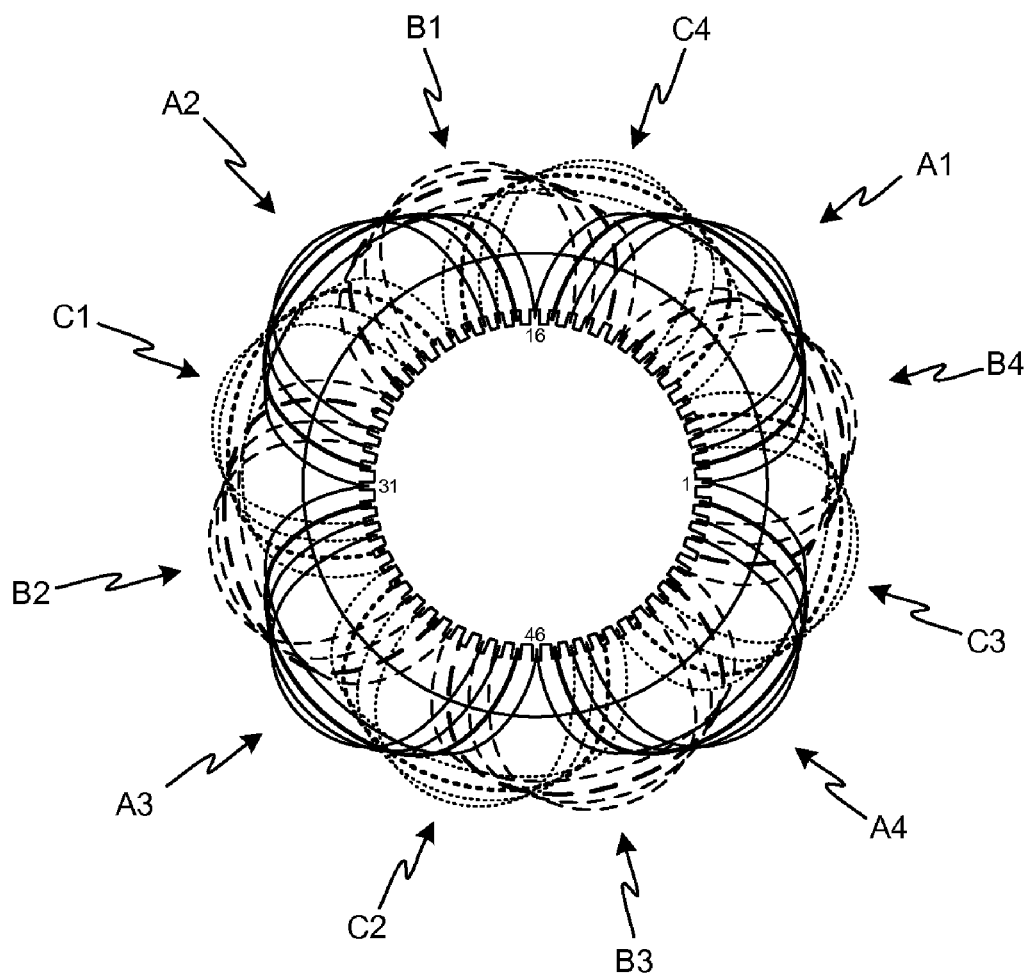
FIG. 12 diagrammatically illustrates the coil configuration for each phase of the third preferred embodiment.

FIGS. 10-12 illustrate a third preferred embodiment of the invention. As in the second embodiment, each coil group in this embodiment is comprised of five coils, two coils of which are inserted within a single stator slot. In this embodiment, the second outermost coil of each coil group is a double-turn coil, whereas in the second embodiment the first outermost coil of each group is the double-turn coil. Unlike the second embodiment, however, in this embodiment during fabrication of a single winding layer there is limited overlap between coil groups. More specifically, during fabrication of each winding layer there are three slots in which two different coil groups are inserted into the same slot, i.e., slots 16, 36 and 56 in the first layer and slots 6, 26 and 46 in the second layer.

Figure 15:
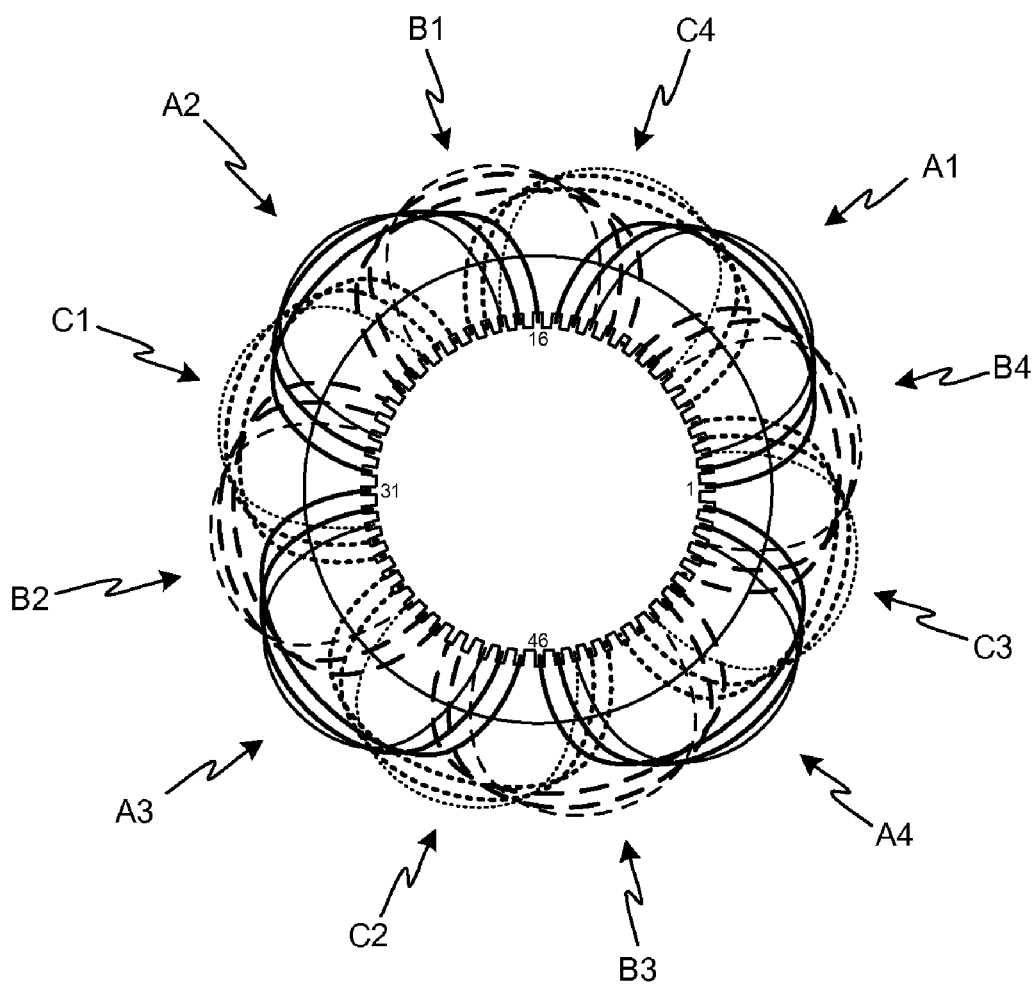
FIG. 15 diagrammatically illustrates the coil configuration for each phase of the fourth preferred embodiment.

FIGS. 13-15 illustrate a fourth preferred embodiment of the invention that also includes five coils per coil group. In this embodiment, within each coil group there are two double-turn coils. More specifically and as shown, the first outermost coil of each group is a double-turn coil as with the second embodiment. Additionally, the second outermost coil of each coil group is also a double-turn coil, as with the third embodiment. This embodiment is similar to the second embodiment, however, in that during fabrication of a single winding layer there is no overlap between coil groups in that layer.

Figure 18:
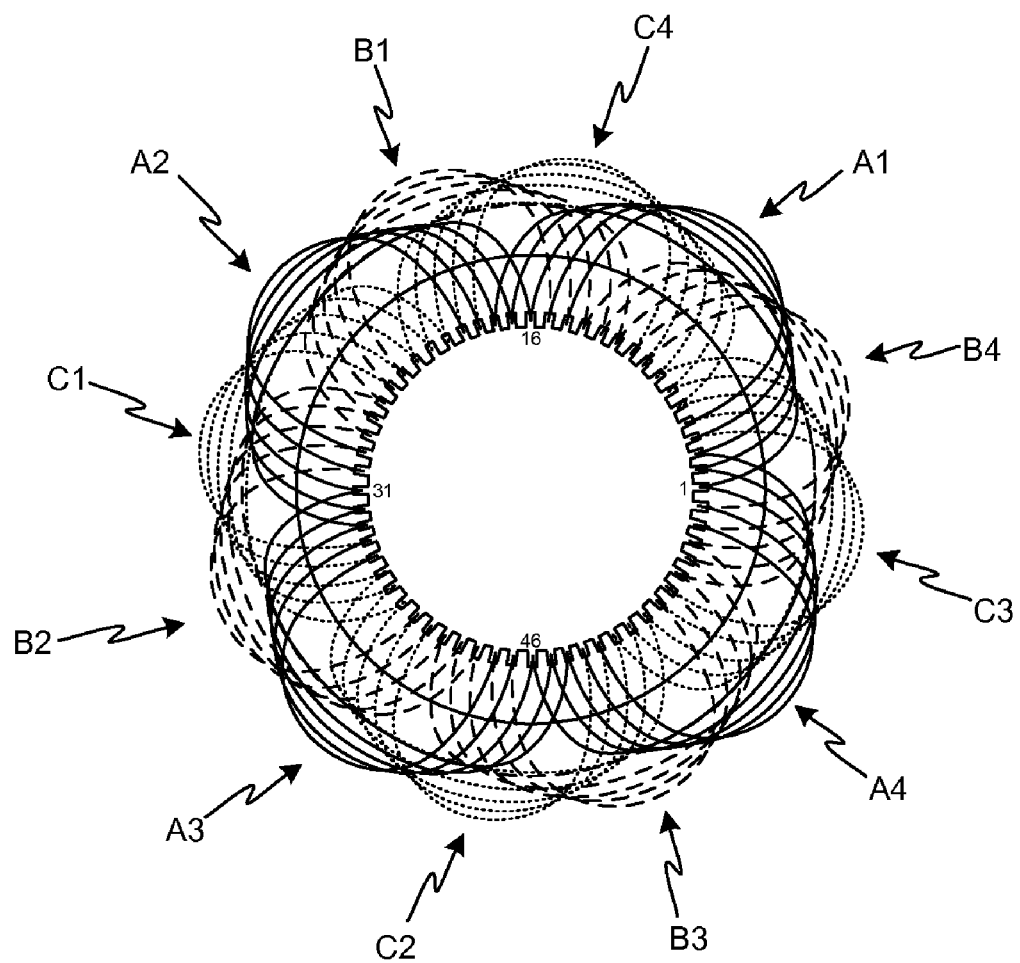
FIG. 18 diagrammatically illustrates the coil configuration for each phase of the fifth preferred embodiment.

FIGS. 16-18 illustrate a fifth preferred embodiment of the invention. As with the first embodiment, each coil group in this embodiment is comprised of five coils with no coil doubling within a group. Unlike the first embodiment, however, this embodiment does overlap coils from different coil groups during both the first and second layer fabrication steps. For example, during insertion of the first winding layer, three A2 coils are located on top of three A1 coils within slots 16-18.

Figure 21:
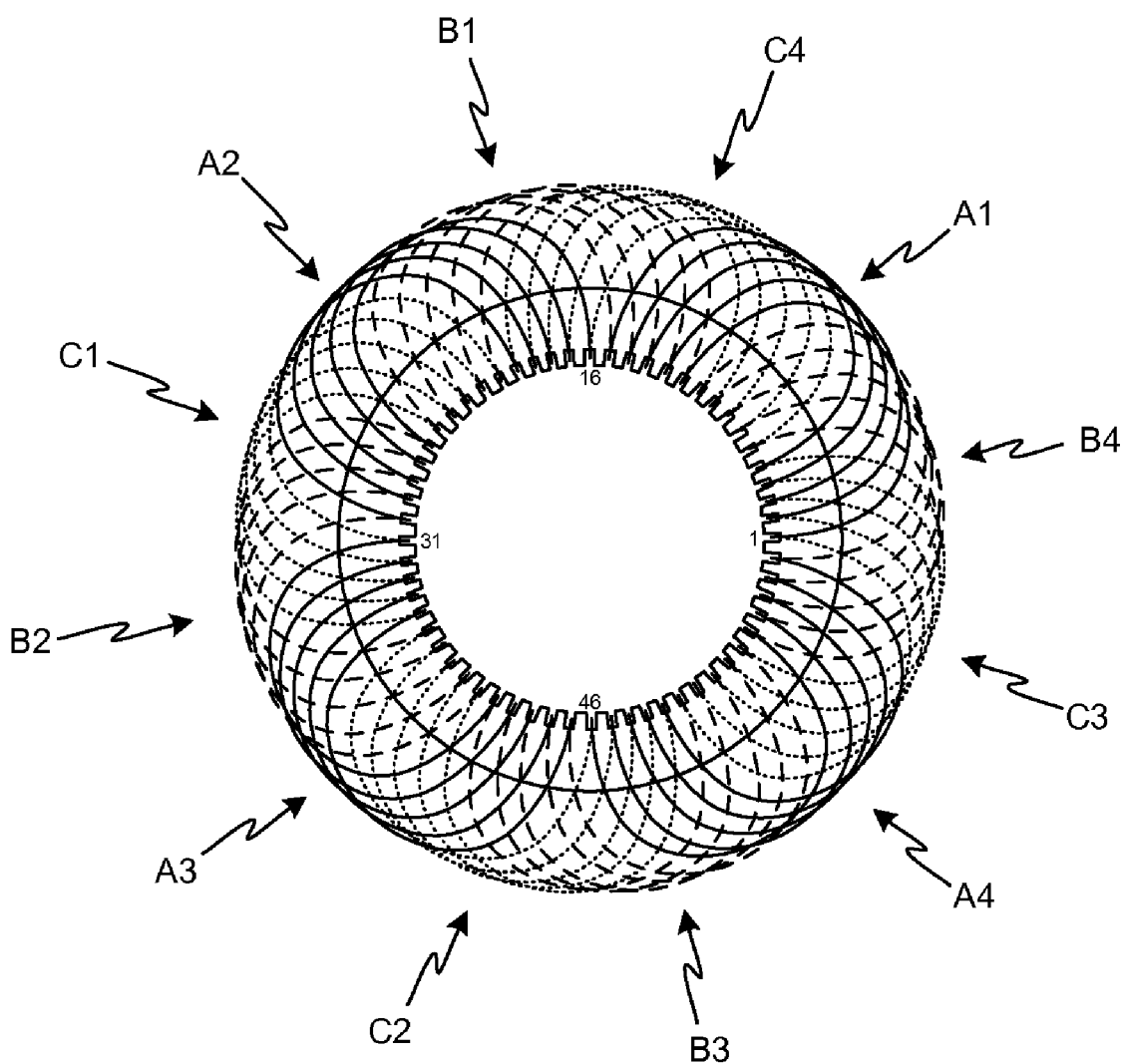
FIG. 21 diagrammatically illustrates the coil configuration for each phase of the sixth preferred embodiment.

FIGS. 19-21 illustrate a sixth preferred embodiment of the invention. As with the first and fifth embodiments, preferably each coil group in this embodiment is comprised of five coils with no coil doubling within a group. As with the first embodiment, in the sixth embodiment there is no overlap between different coil groups during either the first or second layer fabrication steps. Unlike the previous embodiments, however, in the sixth embodiment the coils within each coil group are completely lap wound. Accordingly, while the tables of FIGS. 2 and 19 are identical, the differences between embodiments one and six are illustrated in FIGS. 20 and 21 which show the lap winding approach utilized for each coil group in the sixth embodiment.

The sixth embodiment lends itself to several different fabrication approaches. In the preferred approach, which is similar to an approach applicable to the above embodiments, pole pairs for each phase are first fabricated, preferably using an automated winding machine. Preferably each pole pair is fabricated from a continuous wire/wire bundle so that the inter-pole connection between the two poles of each pole pair are formed automatically, thereby eliminating the need to form these particular inter-pole connections after insertion of the coils. Thus, for example, the pole pairs for coil groups A1 and A2 would be formed from a continuous wire/wire bundle; the pole pairs for coil groups A3 and A4 would be formed from a second continuous wire/wire bundles; the pole pairs for coil groups B1 and B2 would be formed from a third continuous wire/wire bundle; etc. Next, and as shown in FIGS. 19-21, the first layer is inserted, the first layer comprised of coil groups A1, A2, B3, B4, C1 and C2. Then, phase insulation separators are inserted, as required, followed by insertion of the second layer comprised of coil groups A3, A4, B1, B2, C3 and C4. After insertion of a retaining wedge, as required, external lugs and external connections are formed as noted in FIG. 6.

FIG. 22 illustrates a seventh configuration that is closely related to the sixth embodiment. In this embodiment, a three winding layer design is used in which each layer is comprised of one phase. While three winding layers are used, rather than two, the slot locations for the coil groups of the seventh embodiment are the same as the coil group slot locations in the sixth embodiment. However, and as noted below, the locations within some of the stator slots is changed, e.g., changing between an upper slot location and a lower slot location. Therefore FIGS. 20 and 21 remain unchanged between the sixth and seventh embodiments, but the table illustrated in FIG. 19 for the sixth embodiment is modified as shown in FIG. 22 in order to allow a complete phase to be inserted in a single winding layer. In particular, and as a result of this approach, coil groups A3, A4, B1 (slots 21-25), and B2 (slots 36-40) are inserted into the lower portion, rather than the upper portion, of the stator slots as shown in FIG. 22. Similarly, in this approach coil groups B3 (slots 41-45), B4 (slots 56-60), C1 and C2 are inserted into the upper portion, rather than the lower portion, of the stator slots. An advantage of this approach is that it is possible to wind all four coil groups for each phase from a continuous wire/wire bundle, thereby eliminating the inter-pole connections shown in FIG. 6 (i.e., lugs A, B and C).

In the accompanying figures, it should be understood that identical element symbols used on multiple figures refer to the same component, or components of equal functionality. Additionally, the accompanying figures are only meant to illustrate, not limit, the scope of the invention.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A three-phase, four pole electric motor, comprising:
a stator with a plurality of slots;
a first winding layer contained within at least a first subset of said plurality of slots, wherein said first winding layer is comprised of a first set of six coil groups, wherein said first set of six coil groups is comprised of a first and a second first phase coil group, a first and a second second phase coil group, and a first and a second third phase coil group;
a second winding layer contained within at least a second subset of said plurality of slots, wherein said second winding layer is comprised of a second set of six coil groups, wherein said second set of six coil groups is comprised of a third and a fourth first phase coil group, a third and a fourth second phase coil group, and a third and a fourth third phase coil group; and
wherein said first and second first phase coil groups comprise a first pole pair of said first phase, wherein said third and fourth first phase coil groups comprise a second pole pair of said first phase, wherein said first and second second phase coil groups comprise a first pole pair of said second phase, wherein said third and fourth second phase coil groups comprise a second pole pair of said second phase, wherein said first and second third phase coil groups comprise a first pole pair of said third phase, and wherein said third and fourth third phase coil groups comprise a second pole pair of said third phase.

2. The three-phase, four pole electric motor of claim 1, further comprising:
a first inter-pole connection electrically connecting said first first phase coil group to said second first phase coil group, wherein said first first phase coil group and said second first phase coil group are formed from a first continuous wire or wire bundle such that said first inter-pole connection is automatically formed during fabrication of said first winding layer, and wherein said automatic formation of said first inter-pole connection eliminates post-insertion fabrication of said first inter-pole connection;
a second inter-pole connection electrically connecting said first second phase coil group to said second second phase coil group, wherein said first second phase coil group and said second second phase coil group are formed from a second continuous wire or wire bundle such that said second inter-pole connection is automatically formed during fabrication of said first winding layer, and wherein said automatic formation of said second inter-pole connection eliminates post-insertion fabrication of said second inter-pole connection;

a third inter-pole connection electrically connecting said first third phase coil group to said second third phase coil group, wherein said first third phase coil group and said second third phase coil group are formed from a third continuous wire or wire bundle such that said third inter-pole connection is automatically formed during fabrication of said first winding layer, and wherein said automatic formation of said third inter-pole connection eliminates post-insertion fabrication of said third inter-pole connection;

a fourth inter-pole connection electrically connecting said third first phase coil group to said fourth first phase coil group, wherein said third first phase coil group and said fourth first phase coil group are formed from a fourth continuous wire or wire bundle such that said fourth inter-pole connection is automatically formed during fabrication of said second winding layer, and wherein said automatic formation of said fourth inter-pole connection eliminates post-insertion fabrication of said fourth inter-pole connection;

a fifth inter-pole connection electrically connecting said third second phase coil group to said fourth second phase coil group, wherein said third second phase coil group and said fourth second phase coil group are formed from a fifth continuous wire or wire bundle such that said fifth inter-pole connection is automatically formed during fabrication of said second winding layer, and wherein said automatic formation of said fifth inter-pole connection eliminates post-insertion fabrication of said fifth inter-pole connection; and a sixth inter-pole connection electrically connecting said third third phase coil group to said fourth third phase coil group, wherein said third third phase coil group and said fourth third phase coil group are formed from a sixth continuous wire or wire bundle such that said sixth inter-pole connection is automatically formed during fabrication of said second winding layer, and wherein said automatic formation of said sixth inter-pole connection eliminates post-insertion fabrication of said sixth inter-pole connection.

3. The three-phase, four pole electric motor of claim 1, wherein said stator has 60 slots.

4. The three-phase, four pole electric motor of claim 1, wherein each coil group of said first set of six coil groups and said second set of six coil groups is comprised of five coils.

5. The three-phase, four pole electric motor of claim 1, wherein each coil group of said first winding layer is arranged in a concentric pattern, wherein there is no overlap between the concentric coil groups comprising said first winding layer, wherein said first winding layer fills a lower portion of every slot of said plurality of slots, wherein each coil group of said second winding layer is arranged in a concentric pattern, wherein there is no overlap between the concentric coil groups comprising said second winding layer, and wherein said second winding layer fills an upper portion of every slot of said plurality of slots.

6. The three-phase, four pole electric motor of claim 5, wherein each coil group of said first and second winding layers is comprised of a plurality of coils, wherein each of said plurality of coils for each coil group is a single turn coil.

7. The three-phase, four pole electric motor of claim 5, wherein each coil group of said first and second winding layers is comprised of a set of five coils, wherein each coil of each set of five coils is a single turn coil.

8. The three-phase, four pole electric motor of claim 1, wherein each coil group of said first and second winding layers is comprised of a plurality of coils, wherein one of said plurality of coils for each coil group is a double turn coil.

9. The three-phase, four pole electric motor of claim 8, wherein said double turn coil for each coil group of said first and second winding layers corresponds to an outermost coil position for that coil group.

10. The three-phase, four pole electric motor of claim 8, wherein said double turn coil for each coil group of said first and second winding layers corresponds to a coil position adjacent to an outermost coil position for that coil group.

11. The three-phase, four pole electric motor of claim 1, wherein each coil group of said first and second winding layers is comprised of a set of four coils, wherein three coils of each set of four coils is a single turn coil, wherein one coil of each set of four coils is a double turn coil, and wherein said double turn coil corresponds to an outermost coil position for that coil group.

12. The three-phase, four pole electric motor of claim 1, wherein each coil group of said first and second winding layers is comprised of a set of four coils, wherein three coils of each set of four coils is a single turn coil, wherein one coil of each set of four coils is a double turn coil, and wherein said double turn coil corresponds to a coil position adjacent to an outermost coil position for that coil group.

13. The three-phase, four pole electric motor of claim 1, wherein each coil group of said first and second winding layers is comprised of a plurality of coils, and wherein each plurality of coils is comprised of a first double turn coil and a second double turn coil.

14. The three-phase, four pole electric motor of claim 13, wherein said first double turn coil for each coil group of said first and second winding layers corresponds to an outermost coil position for that coil group, and wherein said second double turn coil for each coil group of said first and second winding layers corresponds to a coil position adjacent to said outermost coil position for that coil group.

15. The three-phase, four pole electric motor of claim 1, wherein each coil group of said first and second winding layers is comprised of a set of three coils, wherein a first coil of each set of three coils is a single turn coil, wherein a second coil of each set of three coils is a first double turn coil that corresponds to an outermost coil position for that coil group, and wherein a third coil of each set of three coils is a second double turn coil that corresponds to a coil position adjacent to said outermost coil position for that coil group.

16. The three-phase, four pole electric motor of claim 1, wherein each coil group of said first winding layer is arranged in a concentric pattern and each coil group of said second winding layer is arranged in a concentric pattern, wherein said second first phase coil group overlaps said first first phase coil group, wherein said second second phase coil group overlaps said first second phase coil group, wherein said second third phase coil group overlaps said first third phase coil group, wherein said fourth first phase coil group overlaps said third first phase coil group, wherein said fourth second phase coil group overlaps said third second phase coil group, and wherein said fourth third phase coil group overlaps said third third phase coil group.

17. The three-phase, four pole electric motor of claim 1, wherein each coil group of said first winding layer is comprised of five coils arranged in a concentric pattern and each coil group of said second winding layer is comprised of five coils arranged in a concentric pattern, wherein three coils of said second first phase coil group overlap three coils of said first first phase coil group, wherein three coils of said second second phase coil group overlap three coils of said first second phase coil group, wherein three coils of said second third phase coil group overlap three coils of said first third phase coil group, wherein three coils of said fourth first phase coil group overlap three coils of said third first phase coil group, wherein three coils of said fourth second phase coil group overlap three coils of said third second phase coil group, and wherein three coils of said fourth third phase coil group overlap three coils of said third third phase coil group.

18. The three-phase, four pole electric motor of claim 1, wherein each coil group of said first winding layer is arranged in a lap winding pattern, wherein there is no overlap between individual coil groups comprising said first winding layer, wherein said first winding layer fills a lower portion of every slot of said plurality of slots, wherein each coil group of said second winding layer is arranged in a lap winding pattern, wherein there is no overlap between individual coil groups comprising said second winding layer, and wherein said second winding layer fills an upper portion of every slot of said plurality of slots.

19. The three-phase, four pole electric motor of claim 18, wherein each coil group of said first and second winding layers is comprised of a plurality of coils, wherein each of said plurality of coils for each coil group is a single turn coil.

20. The three-phase, four pole electric motor of claim 18, wherein each coil group of said first and second winding layers is comprised of a set of five coils, wherein each coil of each set of five coils is a single turn coil.

* * * * *